US007747688B2

(12) United States Patent
Narayanaswami et al.

(10) Patent No.: US 7,747,688 B2
(45) Date of Patent: Jun. 29, 2010

(54) SYSTEM AND METHOD FOR MANAGING GROUP INTERACTION SESSION STATES

(75) Inventors: Chandrasekhar Narayanaswami, Wilton, CT (US); Mandayam Thonadur Raghunath, Anandanagar (IN); Marcel-Catalin Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 11/672,080

(22) Filed: Feb. 7, 2007

(65) Prior Publication Data
US 2008/0189365 A1    Aug. 7, 2008

(51) Int. Cl.
*G06F 15/16* (2006.01)

(52) U.S. Cl. .................. 709/204; 709/223; 709/227; 709/219; 709/228; 709/202; 709/203; 709/238; 370/352; 370/260; 370/401; 726/9; 726/23; 726/12; 726/13; 726/14

(58) Field of Classification Search .................. 709/204, 709/223, 206, 227, 228, 238, 203, 202
See application file for complete search history.

(56) References Cited

U.S. PATENT DOCUMENTS

| 5,826,085 | A  | * | 10/1998 | Bennett et al. ............... 719/316 |
| 6,446,004 | B1 |   | 9/2002  | Cao et al. |
| 6,587,870 | B2 |   | 7/2003  | Takagi et al. |
| 7,222,165 | B1 | * | 5/2007  | Ellis et al. .................... 709/223 |
| 2004/0174981 | A1 |   | 9/2004  | Ushida |
| 2006/0031341 | A1 | * | 2/2006  | White et al. ................. 709/206 |
| 2009/0063645 | A1 | * | 3/2009  | Casey et al. ................. 709/206 |

* cited by examiner

*Primary Examiner*—Jude J Jean Gilles
(74) *Attorney, Agent, or Firm*—Michael J. Buchenhorner; Kenneth R. Corsello

(57) ABSTRACT

A services broker provides session suspend and resume capabilities to a computer-supported multi-user session made up of associations between a plurality of participants and the services broker. The services broker includes: a memory; an input/output subsystem for transmission of session data and for communicating with the plurality of participants; a processor, operatively connected to the memory, for carrying out instructions. The instructions cause the processor to: receive a trigger event from at least one of the plurality of participants, the trigger event for resuming a suspending session; verify that the suspending session can be resumed; transmit a resume request to the plurality of participants; and re-establish associations among the plurality of participants. Additionally, the services broker will transmit a stored session state and stored session data to at least one environmental device for resuming the suspended session at the point where the suspended session ended. The services broker also carries out instructions for suspending a joint session.

20 Claims, 8 Drawing Sheets

Group Interaction Session

Suspended Session State

SYSTEM AND METHOD FOR MANAGING GROUP INTERACTION SESSION STATES

CROSS-REFERENCE TO RELATED APPLICATIONS

This application contains subject matter similar to that disclosed in U.S. patent application Ser. No. 11/544,107, filed on Oct. 6, 2006.

STATEMENT REGARDING FEDERALLY SPONSORED-RESEARCH OR DEVELOPMENT

The invention described herein was jointly funded by the Korean Ministry of Information and Communication and IBM. It was funded in part by a grant from the Republic of Korea, Institute of Information Technology and Assessment (IITA), and in part by Korea Ubiquitous Computing Lab (UCL). The government of the Republic of Korea may have certain rights under the invention.

INCORPORATION BY REFERENCE OF MATERIAL SUBMITTED ON A COMPACT DISC

Not Applicable.

FIELD OF THE INVENTION

The invention broadly relates to the field of groupware and more particularly relates to the field of managing collaborative sessions.

BACKGROUND OF THE INVENTION

The rapidly evolving enabling technology of computer networking and its associated hardware and software services has dramatically altered the business landscape. New techniques for communication between people in different locations have been pivotal in the success of many organizations. The increased availability of computer networks and the trend towards distributed team work has empowered workers to operate efficiently anywhere, giving rise to a new term, "telecooperation." Telecooperation is defined as persons working together in real-time on collaborative tasks while at different locations, with the persons known as "teleworkers." The notion of computer support for telecooperation has come to be known as "groupware" or computer-supported cooperative work ("CSCW"). CSCW refers to any computer-based system that provides an interface to a shared environment where a group of users works together towards a common goal. The key elements of CSCW are group awareness, multi-user interfaces, concurrency control, communication and coordination within the group, and shared information space.

Referring to FIG. 1 there is shown a representation of a group interaction session 100 among four mobile devices: a PDA 140 and three laptops 130, 150, and 160. The four mobile devices represented here are sharing the services of an environmental service device 110 which in this example is a shared interactive whiteboard such as the SMART Board™ by SMART Technologies. The four mobile devices are able to interact with the whiteboard 110 through a wireless connection. Groupware tools such as IBM's Lotus Domino and shared whiteboards facilitate such collaborative efforts.

In the example of FIG. 1 the four mobile devices are all participants in the session 100 and they are all sharing the display capabilities of the whiteboard 110. The users of each of the mobile devices are able to view the display screen of the whiteboard 110 on their smaller screens, in real-time. As the contents of the whiteboard change, so too will the content on the mobile device screens. Anything written or drawn on the shared whiteboard 110 will show up on each participant's display. Each of the users of the mobile devices will be able to input data and make revisions to the content of the whiteboard 110.

The interactions among the mobile devices and the whiteboard 110 are synchronous and the feedback is immediate. At any point in time the session 100 has a well-defined state which can be changed by events transmitted over the wireless network 180. These events are initiated by user actions, such as text added to the whiteboard 110 (again via the wireless network 180), or changing the display on the whiteboard 110. Within a session, a direct connection between two devices is termed an "association." Each of the mobile devices 130, 140, 150, and 160 has an association with the whiteboard 110. The associations in FIG. 1 are represented by dashed lines.

Modern computer-supported cooperative work applications supporting same-time/different-place interaction, such as the one illustrated in FIG. 1, are often required to open several communication channels (associations). The problem is that once a session is suspended, there is no easy way to resume the session where it left off and recover the input from the different channels. If the users of the mobile devices in FIG. 1 wish to resume a suspended session they may not be able to resume the session at the point where it was suspended and some data may be lost. They would have to spend time finding the exact spot where the session previously ended. Another problem is that the same group of participants may resume their session, but in a different setting where one of the previous environmental services may not be available. In this instance, the session may be lost if the session information was kept at one of these unavailable services. This is a likely scenario if the setting used to resume the session is far enough from the initial setting. Most, if not all of the devices participating in a session, are collocated; occasionally, sessions can include remote devices hosting services used by the collocated session participants. Such services must be either state-less, which means that no state needs to be saved or restored upon session suspend or resume, respectively, or the services must implement explicit features for state extraction and insertion, to be used upon session suspend or resume, respectively.

Another problem that could arise occurs when the group reconvenes and not all of the participants from the previous session are present. It is also possible that new participants may be added to the session when the session resumes. Changes in the collaborative scenario may make it impossible to recapture a previously suspended session; therefore much time and effort may be lost.

Many of us have experienced the irritation of losing hours of work because of a system failure. In a collaborative scenario, this loss is multiplied by the number of participants in the session. A system failure could wipe out the work of multiple users. Unfortunately, recovery procedures are generally not adequate for groupware sessions as described in FIG. 1.

There is a need for a better method of managing collaborative sessions in order to overcome the shortcomings of the prior art.

SUMMARY OF THE INVENTION

Briefly, according to an embodiment of the invention a services broker can resume a computer-supported multi-user session made up of associations among a plurality of participants and the services broker. The service broker includes: a memory; an input/output subsystem for transmission of session data and for communicating with the plurality of participants; a processor, operatively connected to the memory, for carrying out instructions. The instructions cause the processor to: receive a trigger event from at least one of the plurality of participants, the trigger event for resuming a suspending session; verify that the suspended session can be resumed; transmit a resume request to the plurality of participants; and re-establish associations among the plurality of participants. Additionally, the processor will transmit a stored session state and stored session data to at least one environmental device for resuming the suspended session at the point where the suspended session ended.

According to an embodiment of the invention, the services broker can also suspend a multi-user session including associations involving a plurality of participants, and the services broker. The services broker processor performs the following: transmits a suspend request to the plurality of participants, upon receipt of an exit event from at least one of the plurality of participants; receives an exit session state from each of the plurality of participants and an at least one environmental device; acknowledges receipt of each of the exit session states; and stores the session data.

A computer-implemented method for establishing and suspending a computer-supported multi-user session among a plurality of participants and a services broker includes the following steps: a) assigning a unique session identifier to the session; b) selecting the at least one environmental device for providing services to the participants; c) assigning unique identifiers to the participants and to the at least one environmental device; d) transmitting a suspend request to the environmental device upon receipt of an exit event from a participant; e) receiving an exit session state from the environmental device; f) acknowledging receipt of the session state; and g) storing the session state and session data.

The services broker resumes a suspended session according to the following method: a) receiving a trigger event from a participant; b) verifying that the suspended session can be resumed; c) selecting at least one environmental device for providing services to the participants; d) transmitting a resume request to the environmental device; and e) transmitting a stored session state and stored session data to the environmental device for resuming the suspended session at the point where the session ended.

BRIEF DESCRIPTION OF THE DRAWINGS

We use the following detailed description of an exemplary embodiment of the invention to describe the foregoing and other exemplary purposes, aspects, and advantages of the invention, in which.

DETAILED DESCRIPTION

We describe a capability for the capture and resumption of a computer-supported multi-user interface session. An embodiment of the present invention enables the suspension and resumption of interactive sessions that include multiple participants, communicating over a network. Known products allow users to suspend active computation on their laptops or PDAs. However, there is no known solution for suspending the joint session of multiple devices, capturing that session, and then resuming the joint session later on, possibly at a different location. This functionality is particularly useful for groups of teleworkers who meet periodically through interactive sessions. Essentially, the participants can resume a session exactly where the last session ended. In this manner, the participants can be more productive instead of losing time recapping what transpired in the last session and searching for the stopping point of the last session.

In addition, an embodiment of this invention, as will be described below, gives individual participants the ability to replay a session, or a consistent fragment of the session, at a selected speed, slower or faster than real-time. This is particularly useful for late-joiners. A consistent fragment of a session consists of all the session interactions over a shorter time interval than the session's lifetime, or all of the interactions between a subset of the participant devices, or both. A session, or a session fragment, can also be replayed multiple times.

Figure 1:
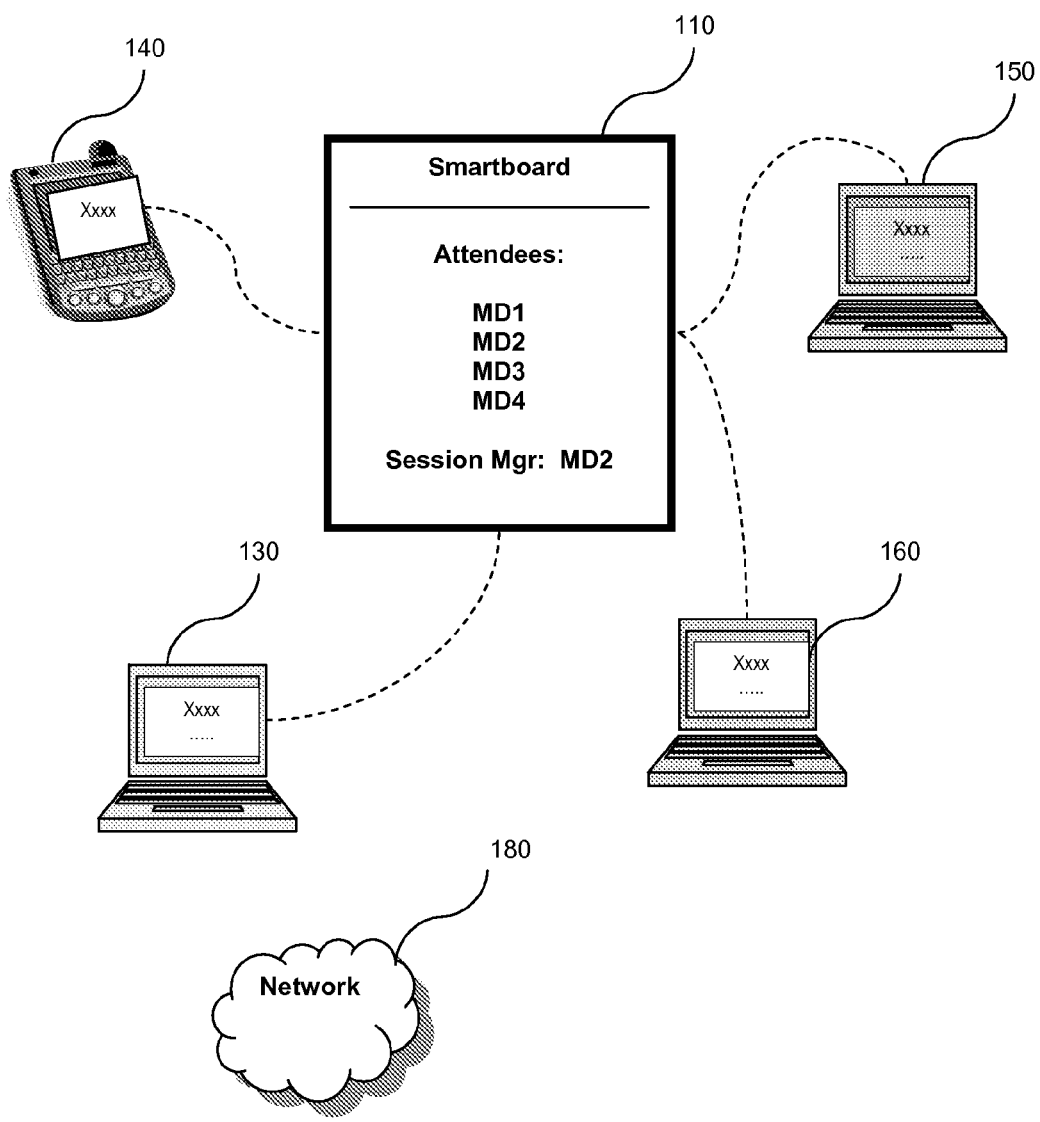
FIG. 1 is an illustration representing a group interaction session among four mobile devices, according to the known art.
Figure 2:
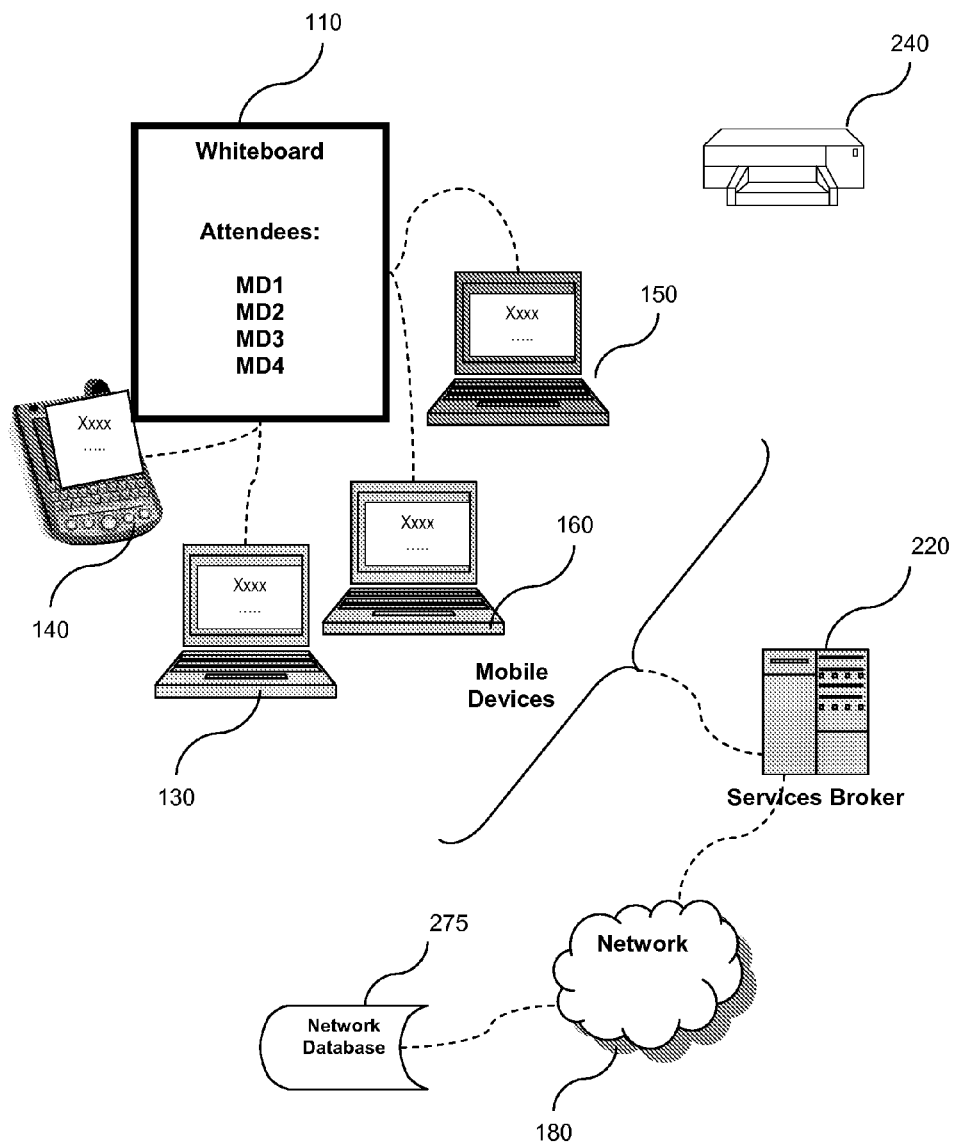
FIG. 2 is an illustration of the group interaction session of FIG. 1, with the addition of a services broker for managing the collaborative session, according to an embodiment of the invention.

Referring to FIG. 2 there is shown a collaborative scenario according to an embodiment of the present invention. FIG. 2 depicts a collaboration scenario similar to that of FIG. 1, with the addition of a services broker 220 and another environmental service, in this case a printer 240. Also shown is a network database 275. In collaboration scenarios there may be several participants, and several environmental services (ESs). In the scenario of FIG. 2 the mobile devices shown are the participants in the joint session. The environmental services are hosted by devices that are present in the vicinity where the participants are currently stationed (the "service zone") and these devices offer their services to an individual or a group.

The key component of this session 200 is the services broker 220. The services broker 220 helps establish and manage the multi-device session 200. As stated earlier, within an established session, a connection between two devices is termed an association. An association can occur between a participant and an environmental service or between a participant and the services broker 220 or between an environmental service and the services broker 220. FIG. 2 portrays associations between each of the four mobile devices 130, 140, 150, and 160, and the environmental service 110; and between each of the four mobile devices 130, 140, 150, and 160 and the services broker 220. The services broker 220 also has an association with the environmental service 110, for a total of nine associations. Note that the printer 240, although located in this service zone, has no association with any device in this particular session. The mobile devices do not have associations with each other. In fact, in some scenarios, the mobile devices are just passing through the service zone and do not need to be aware of each other's presence in the service zone. If, on the other hand, mobile devices are collaborating on a task within the service zone, the mobile devices will need to be aware of each other's presence. In such a situation, the mobile devices will communicate with each other, yet this communication does not represent an association. Communication between the mobile devices does not fall under the purview of the services broker 220.

As shown in FIG. 2 a session 200 may include several associations; for instance there may be an association where a particular participant is using the services of an environmental service to display some content, as shown in FIG. 2, and several other participants are associated with the same environmental service, enabling the respective participants to contribute to the content being displayed. This example is reflected in FIG. 2 where the environmental service in use is a shared whiteboard 110 providing a display service and several participants (the mobile devices 130, 140, 150, and 160) collaborate on a single document at the same time, perhaps making annotations in different colors. Note that this session occurs in real-time. In the context of this discussion, "session" refers to a collection of devices interacting with each other by using the services provided by at least one of the environmental devices located in a service zone.

Another example of a collaborative scenario is a projector showing presentation charts sent from a particular mobile device, while other mobile devices associated with the projector have the ability to control the presentation or add annotations to the presentation charts. The services broker 220 may be located in the local vicinity of the mobile devices and the environmental services or it may be in a remote location, but connected by a high speed network. The session manager is usually the device that initiated the session, unless the initiator has transferred management to another device. New devices can join a session only with the permission of the session manager but they can leave the session freely. Typically the session manager will be one of the participants in the session, although session management can potentially be transferred to any of the other devices in the session. For instance, the device hosting the environmental service could be the session manager.

Each session has a session id associated with it. The mobile devices and environmental services also have unique ids identifying them within the session. The services broker 220 assigns the identification to the devices. For logging purposes, recording the events, such as establishing or terminating an association, may be important. For the purpose of suspending or resuming a session, however, recording the current state is more important. Recording the sequence of events is important if devices (or services) were added to the session implicitly, such as "add display with best resolution that is available" rather than implicitly, such as "add display X". Recording the events (together with the implicit conditions) will allow the session to resume the session in a different location with the 'best' display allocated to the session. Recording events is generally not necessary for the basic session suspend/resume scenarios, but if the situation warrants, recording events can be very useful.

After session establishment, the services broker 220 keeps track of all the associations made in the session 200 among the environmental services and the participants and the sequence in which the associations were made. This is important because in many telecooperative scenarios, the participants are free to join in at any time during the session. Participants in a session do not always join in at the same time. After the associations are made, the services and participants typically communicate directly with each other, excluding the services broker 220, except when help from the services broker 220 is needed, perhaps for transcoding. The services broker 220 is the only unit that has session-relevant information about all participants in the session and this information is preferably stored in a network database 275. The services broker 220 stores all of the ids for all of the participants and the various services.

As devices join the session, they may synchronize their clocks to a common base, such as the clock of the services broker 220. It is expected that the clocks of environmental devices are already synchronized; if not, environmental devices will change their clocks to synchronize with the clock of the session broker 220. Environmental devices use their local clock to timestamp outgoing messages. A mobile device participant will not necessarily change its clock, as its clock may be synchronized with that of another, more important entity, such as the service provider for a cell phone; however, the mobile device will compute the difference between its local time and the time of the service broker 220 (the skew) and adjust the timestamps in all the messages related to this session accordingly. Mobile devices use their local clock and the skew to compute a timestamp. All messages exchanged in a session will have a timestamp. Sessions will have a start time and an end time. The state of a suspended session will have a timestamp—the time the session was suspended (as recorded by the services broker 220).

A method according to the present invention enables the capture of the state of the group interaction and also enables the resumption of that group interaction session at a later point in time, at the exact state previously captured. In today's increasingly mobile workforce, it is not uncommon for the group of participants to resume their session in a different setting. In this new setting the same environmental services may not be available. However, environmental services similar to the ones that are missing may be available in the new setting and can substitute for the unavailable services. In addition, when the group reconvenes, not all of the participants from the previous session may be present. It is also possible that new participants may be added to the session when the session resumes. Further, the role of the session manager may be undertaken by a different mobile device when the session resumes, and the environmental services in the new location may be managed by a services broker 220 that is different from the one that managed the devices at the location where the session was last suspended. In just about any collaborative scenario, there are many possible permutations within the set of elements in the scenario (mobile devices, environmental services, service brokers, networks) and these permutations can be constantly changing. Therefore it is important that the session suspend and resume operations remain independent of the configuration of the session, to the greatest extent possible.

To address this independence, we discuss a capture of a joint session state of multiple devices at the services broker 220. This capture information is then preferably stored in a network database 275, accessible to any authorized user. Two specific operations that are necessary for this function namely suspend and resume, are discussed below.

Figure 3:
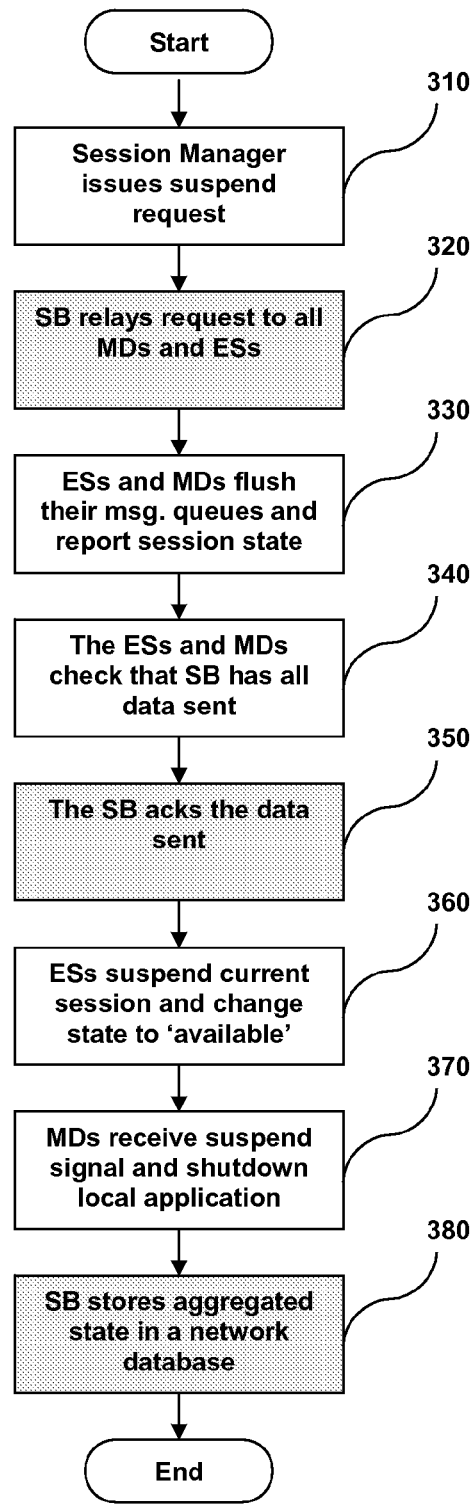
FIG. 3 is a flowchart of a method for suspending a group interactive session, according to an embodiment of the invention.

Referring to FIG. 3 there is shown a flowchart of the method for suspending the group interactive session 200 of FIG. 2. The process begins at step 310 at the point at which the users 130, 140, 150, and 160 are ready to terminate the joint session 200 and resume it at a later time. The session manager (in this case mobile device 140) will issue a request to the services broker 220 to initiate the suspend process. The session manager 140 may also issue the suspend request in response to a request from one of the participant mobile devices. Upon receiving this request, in step 320 the services broker 220 relays the suspend request to all mobile devices (130, 140, 150, and 160) and environmental services 110 associated with the session 200 that the session 200 is to be suspended. Note that environmental service 240 is not currently participating in this particular session (no association has been made), so it is not notified. Environmental service 240 did not have an ID associated with it for this session. It is through the session IDs that the services broker 200 can keep track of all participants in a session.

In step 330, the environmental service 110 and mobile devices 130-160 will flush all pending messages from the network, process all incoming messages (and update their state as a result) and report back to the services broker 220 with the state of the device relevant to this session 200. In this example, because it involves a presentation, the service 110 will report the file name being presented, the last viewed page number and the zoom level, the contents of the shared whiteboard (with all of the participants' input), the last input event it received and the last participant that communicated with it, to the services broker 220. It is important to provide as much session information as possible so that the session can be resumed later in the exact state it was when it was suspended. Table 1 provides an example of some of the session information which will need to be stored. Note that the session information relayed to the services broker 200 will vary according to the nature of the session. At a minimum the environmental service 110 will need to report the information needed to recreate the current state of the service 110 at suspend time.

In some rare cases the service 110 may log every control event it received from the beginning of the session 200. Each entry in the log will include a time-stamp, a session id, a mobile device id, and the type of event. The clock for the time-stamp will be synchronized with the clock running on the services broker 220. A user of a mobile device may wish to have a capture of the entire session, not just the state of the session immediately prior to the suspend state. The user may wish to perform a capture playback of the entire session. With a capture playback, after the session is terminated, the user can rewind the session, pause at certain points, and so on.

In order to have this capability, each device participating in the session must log its local events; typically, one of the devices participating in the session will store the logs for the local events in the session 200. It is arbitrary which device stores the log. The only requirement is that the device has the necessary system requirements, such as adequate memory. The device will need to indicate, at session creation time, whether it has the capability for storing the logs of local events and whether it will do so. Once it is known that a device will store the logs, then only one device needs to do so and any other device can download the logged entries, if desired. The local events logged by the participants will need to be periodically offloaded to the device chosen to store the logs, as many of the participant devices will not have adequate storage capacity.

If a capture of the entire state is not required or requested, then by default only the current state is saved (by the services broker 220) when the suspension of the session is initiated. Local events not affecting the session, such as changing the Orientation on a personal digital assistant (PDA), do not have to be stored in the session log. Keep in mind that recording all events should be done only if necessary because of its potential adverse effects on system performance.

Ideally, the information to be stored is limited to: the session configuration (including the IDs of all session devices) and, upon session suspend, the state of the various mobile and environmental devices. In some extreme cases it may be necessary to store a log in order to enable a session resume, for example, if the state of the service/device cannot be extracted upon session suspend. In such a situation, if a log of events is kept, the service/device can be reset to a known state from the relevant portion of the event log to bring the device/service to the state prior to the suspend operation.

TABLE 1

| Session Log. | |
|---|---|
| Identifier Name | Identifier Data |
| Time-stamp | 082806 15:49:20:30 |
| Session ID | MENLO08280615070345 |
| Mobile device 1 ID | L00380007988 |
| Mobile device 2 ID | P75333008864 |
| Mobile device 3 ID | L00549972012 |
| Mobile device 4 ID | L00700988513 |
| Environmental service ID | PP333000A34A88 |
| Type of event | PPT; interactive; multiple users |
| Location of file | http://www.location.com/index/demo |
| Description of event | File "Demo" - Zoom 3X - Split Screen |
| Last Input Received | 082806 15:35:49 |
| Last MD to Interact | L00549972012 |

In an alternative embodiment, the environmental service 110 and participants may have the ability to suspend their state and save it locally and resume it later when either one of them receives an appropriate signal/message, without requiring transfer of the suspended state to the services broker 220 for storage.

Regardless of the actual method, in step 340 the service 110 will then inquire whether the services broker 220 received all of the relevant data sent by the service 110. In step 350 the services broker 220 acknowledges that the session data has been received and it signals the service 110 that it is free to suspend the session. The service 110 will wait for this acknowledgment before suspending the session. Suspending the session 200 before receiving an acknowledgment from the broker 220 could compromise the session data and make a later resume operation infeasible. If the broker 220 does not acknowledge the data transmission receipt within a specified time, the service 110 will retransmit the data.

Figure 5:
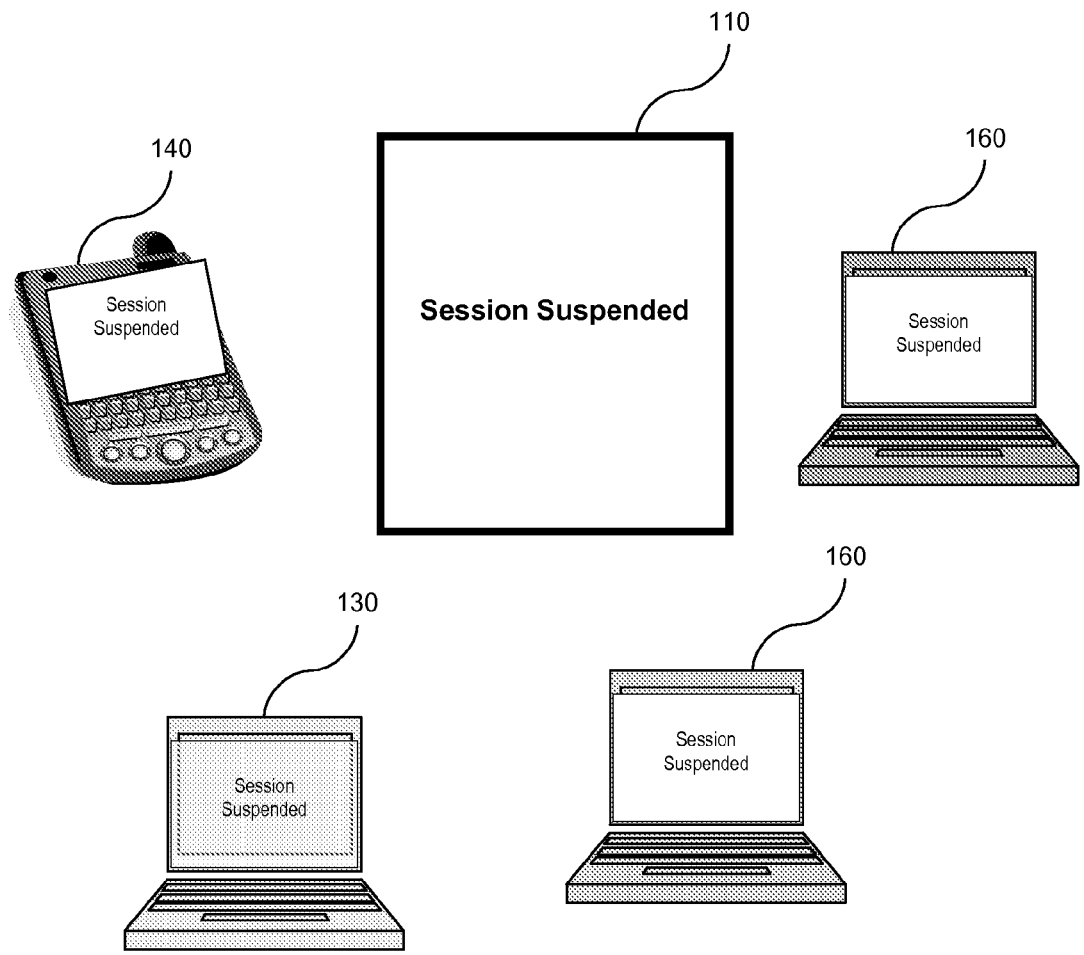
FIG. 5 is an illustration of the group interaction session of FIG. 2 in a suspend state, according to an embodiment of the invention.

Upon suspending the session, the service 110 may invoke its power management scheme or screen saver or default mode to suspend the session in step 360. For example, large displays may revert to displaying a TV news channel, or contents of a home page, or advertisements. Audio devices may play music or become silent. Once the acknowledgement is received from the services broker 220 and the service 110 has suspended its state, the mobile devices will receive a suspend signal in step 370. The suspend signal may be an actual text message appearing in a pop-up window, or a radio frequency signal. In this example, however, the suspend signal is relayed to the mobile devices simply by displaying the suspend state from the display screen of the service 110. Since the mobile devices 130, 140, 150, and 160 are currently associated with this service 110, their respective display areas will concurrently display exactly what is shown on the service 110. This is illustrated in FIG. 5 where the service 110 displays a screen saver with the message "Session Suspended." This same message is reflected in the viewing areas of each of the participants. The technology for this display sync is known and beyond the scope of the present invention. Typically mobile devices run multiple applications, only a few of which are part of the suspending session; these applications will terminate and the screen of the mobile device will revert to the display shown before the device joined/established the session.

Once a participant receives a suspend signal, it can take similar actions to the ones taken by the service 110 such as reverting to a screen saver. Regardless of the action taken by the participant, from this point on until the session 200 is resumed, the participant will be unable to interact with the service 110. In other words, its association will have been torn down.

In order to speed up the suspend process, the services broker 220 is designed to accept data from several services and mobile devices in parallel. For security, the service broker 220 may encrypt all data received from the participants and environmental services with a key and provide that key to the session manager. The session manager may optionally transfer the key to a device that it authorizes to resume a session.

In step 380, the aggregated state that is collected at the services broker 220 is stored in a network database 275 in an encrypted manner and the key to unlock that state is sent to the session manager 140, along with the unique identifier that identifies the suspended session state (see Table 1). The session manager 140 may optionally send this identifier and the key to one or more participants in the session 200, effectively authorizing the participant(s) to resume this suspended session. Note that storing the aggregated session state in a network database is just one option.

Figure 4:
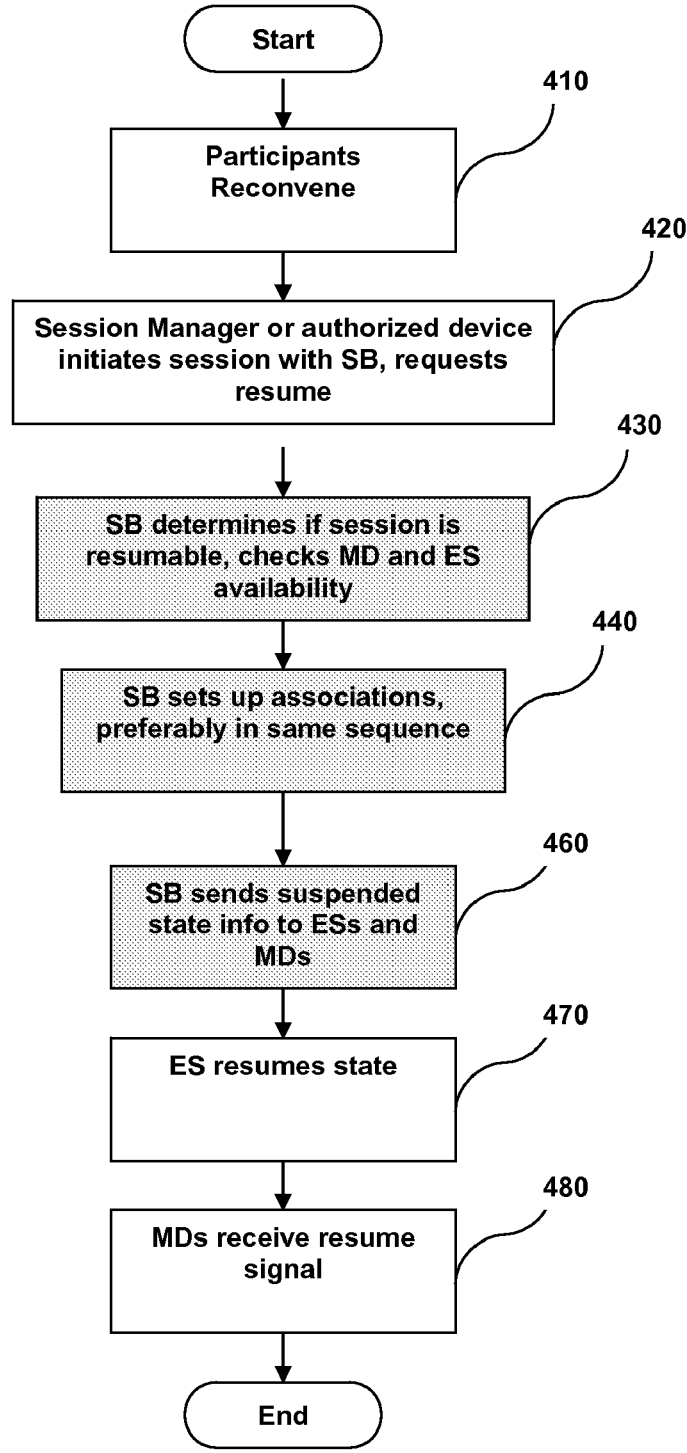
FIG. 4 is a flowchart of a method for resuming the group interactive session of FIG. 3, according to an embodiment of the invention.

Referring to FIG. 4 we discuss the processing for resuming the group interactive session 200 of FIG. 2. At resume time, the participants reconvene at step 410, perhaps at a different location. As discussed before, the participants may have changed. In addition, this location may have a different set of environmental services that are managed by a different services broker 220. Resuming a suspended session with a different services broker 220 and services is possible because the suspended session 500 has been stored in the network database 275; it is not stored with the original services broker 220. In the case of dealing with a different services broker 220, in step 420 one of the mobile devices becomes the session manager and initiates a new session with the new services broker 220, and requests it to resume a previous session that is stored in the network database 275. In this case, this mobile device must have the key and it is automatically designated as the session manager.

The session manager includes as part of its resume request, the key to unlock the suspended session state 500 that is stored in the network database 275. If the identifier and the key corresponding to the suspended session state 500 were shared with more than one mobile device at suspend time, any of these mobile devices can become the session manager and initiate a session resume. For simplicity, the session ID may be composed of the time, date, and location where the session was held, such as the Session ID MENLO08280615070345 shown in Table 1. This session id indicates that the session was held in Menlo Park, Calif. on Aug. 28, 2006. The session was suspended at 2:07 p.m. Pacific Standard Time.

In step 430 the services broker 220 will determine if the session is able to be resumed. Normally, there are two key requirements to resume a session: 1) all the environmental services from the suspended session 500 must be available, or equivalent services can be allocated to the session; and 2) the session 500 was suspended properly. Proper suspension of a session involves successful transmission of the session data to the services broker 220 and receipt of an acknowledgment from the services broker 220.

The services broker 220 will also determine if the corresponding session participants are available. If a particular participant that was part of the suspended session 500 is not available, the services broker 220 will ask the session manager to choose one of the presently available participants to play the role of the missing participant. In general, the services broker 220 may not be able to establish all of the associations that were part of the suspended session state 500. In this case, if the session manager approves, the services broker 220 will resume only those associations that it can resume and omit the others. Once the role of a device is taken, the original device cannot re-assume its role. Typically, local environmental devices assume the roles of former environmental services while the mobile devices remain the same, if available at resume time. Mobile devices can always join the session at a later time, with permission from the session manager.

Since session participants are often mobile devices and mobile devices by their nature are not stationary, the absence of a participant should not prevent session resumption. For example, a participant from the previous session 500 may be absent when the session 500 is being resumed. The session 500 may resume without the absent participant. Alternatively, the resume may be aborted until all of the associations can be re-established.

Next in step 440 the services broker 220 will help set up connections/associations among the participants and the services, in the sequence in which the associations were formerly made. A secure connection is established between two devices, which amounts to the creation and distribution of two crypto tokens or keys, to secure the communication between the two devices of an association. If any of the participants in the sequence is missing, depending on what was decided in the previous step, the device will either be skipped or the process will be aborted. If the device is skipped, then in step 450 each of the other participants will resume their suspended state. In addition, none of the associations between the skipped device(s) and the current participants are restored. The services broker 220 sends the relevant state back to the service 110 at this point in step 460. The service 110 can then process this state information and get back to state at suspend time in step 470. Once the service 110 is set up and back to a resume state, the participants receive a resume signal in step 480. The resume signal can be the appearance of the last screen of the suspended session on their viewing areas, or it can be a radio frequency signal. Other types of signals are possible within the scope of the invention.

Figure 6:
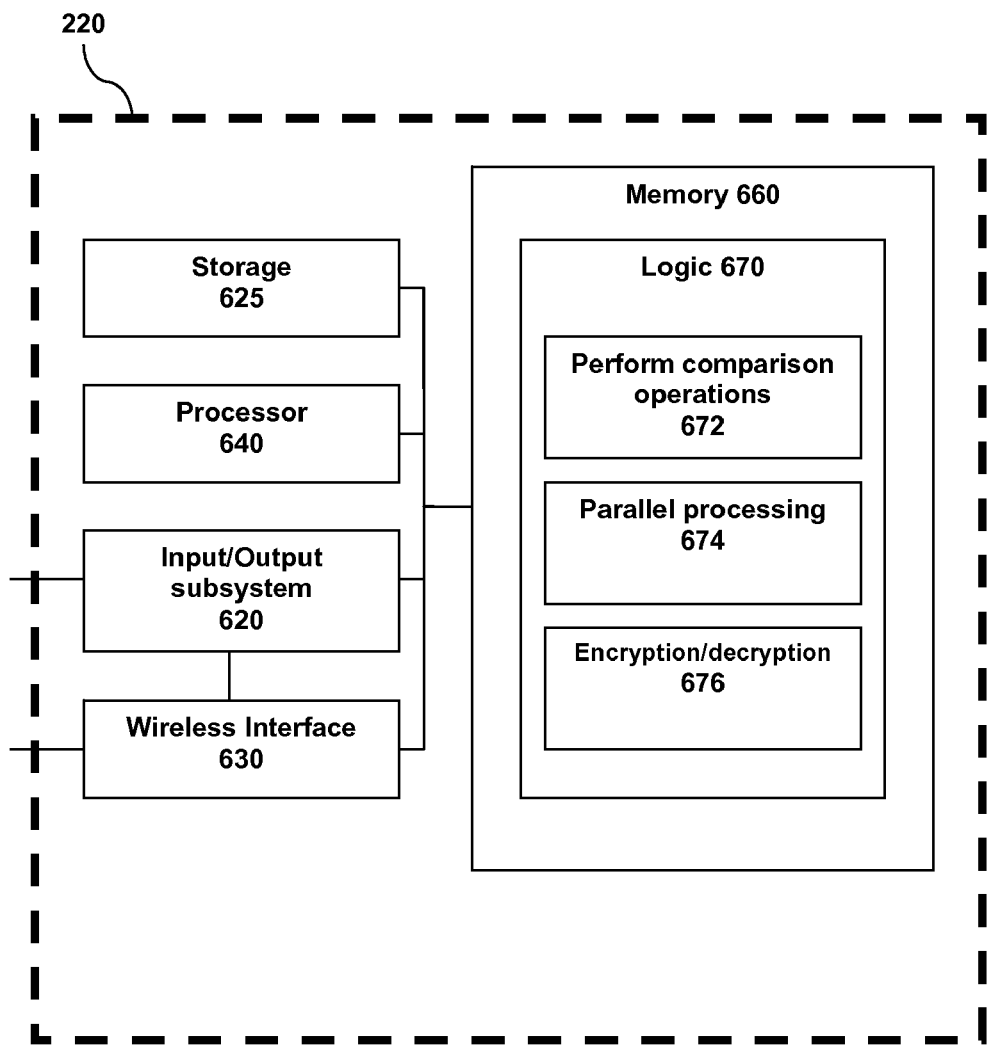
FIG. 6 is a high level block diagram of a services broker according to an embodiment of the invention.

Referring to FIG. 6 there is shown a block diagram representing the services broker 220 as a programmable computer that can be configured to operate according to an embodiment of the invention. The services broker 220 as depicted in FIG. 6 preferably includes an input/output subsystem 620 for interacting with the mobile devices and the environmental services. The input/output subsystem will preferably include a wireless interface 630. The services broker 220 may optionally include storage 625 for storing the session data. Alternatively, the session data may be stored in a remote storage location. A processor 640 is configured for performing the processing of the data submitted to the broker 220. The processor 640 may include one or more microprocessors. Note that the processor 640 must be capable of supporting multiple device interactions at once (parallel processing). The processor 640 may be configured to run program code stored in memory 660 or hard-wired program code.

Memory 660 for a services broker 220 represents either a random-access memory or mass storage. It can be volatile or non-volatile. The broker 220 can also comprise a magnetic media mass storage device such as a hard disk drive. The memory 660 includes logic 670 for carrying out specific functions, such as: performing comparison operations 672, processing multiple interactions 674, and encryption/decryption 676. What has been shown and discussed is a highly-simplified depiction of a programmable computer apparatus. Those skilled in the art will appreciate that other low-level components and connections are required in any practical application of a computer apparatus.

Figure 7:
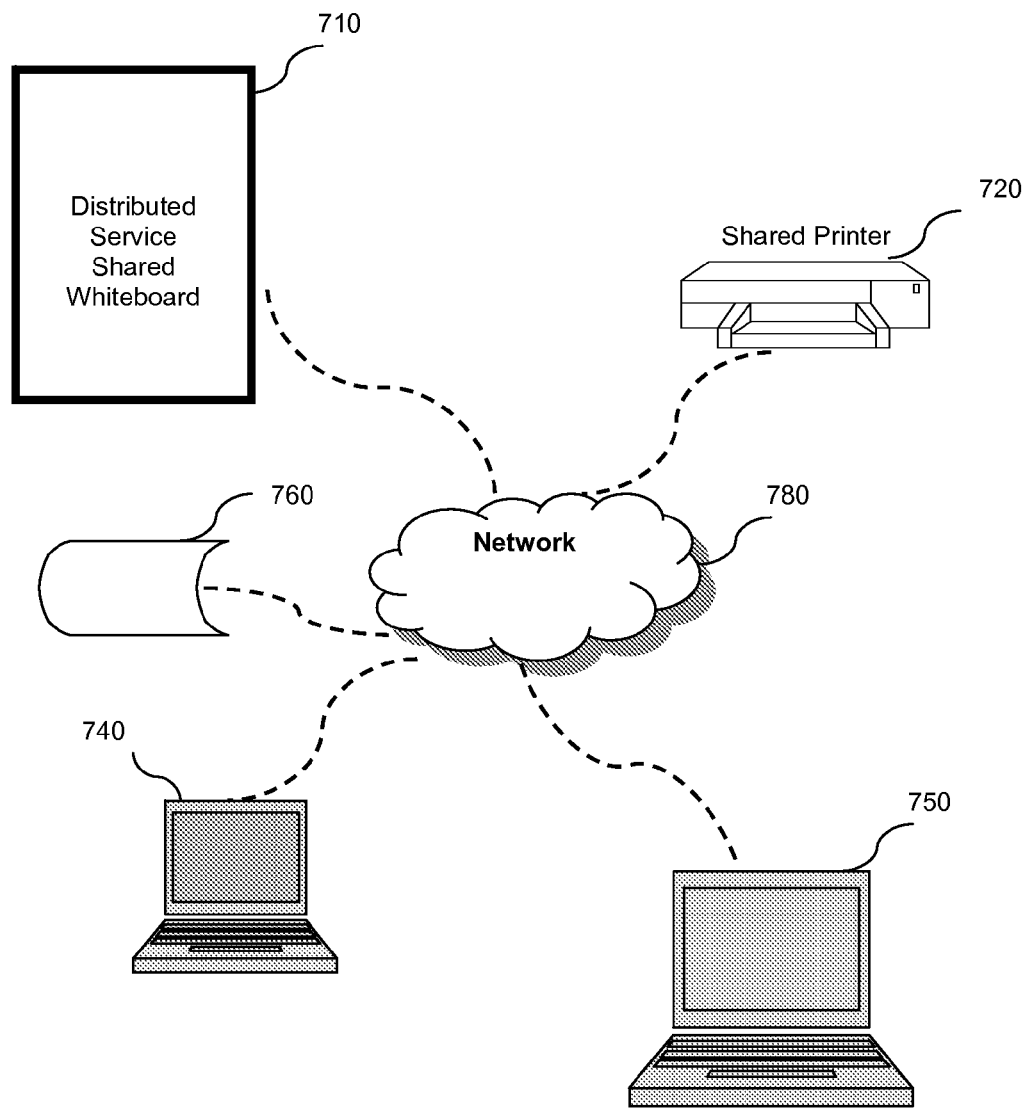
FIG. 7 is an illustration of a group interaction session with two mobile devices sharing the duties of a services broker, according to an embodiment of the invention.

The services broker 220 does not necessarily represent a separate machine, but rather a set of services that are available for the collaborating devices to use. For instance, in sessions comprising a small number of devices, the functionality offered by the services broker 220 could be provided on any one of the environmental services or mobile devices, or even split amongst the participant devices, as shown in FIG. 7. Session 700 involves a wireless network 780, and mobile devices 740 and 750. The collaborative session 700 of FIG. 7 also includes two environmental services: a shared whiteboard 710 and a shared printer 720. In addition two laptops 740 and 750 share the functions of a services broker. A wireless network 780 allows for wireless communication among the devices. In this session 700, laptop 740 collects the session information (session ID, device ID, type of session) and acts as the session manager. Laptop 750, because it has greater capacity, logs all events and stores the information in a network database 760 which is accessed through the wireless network 780. Laptop 750 also controls the session 700 suspend and resume activities, once it has received notification from laptop 740.

Figure 8:
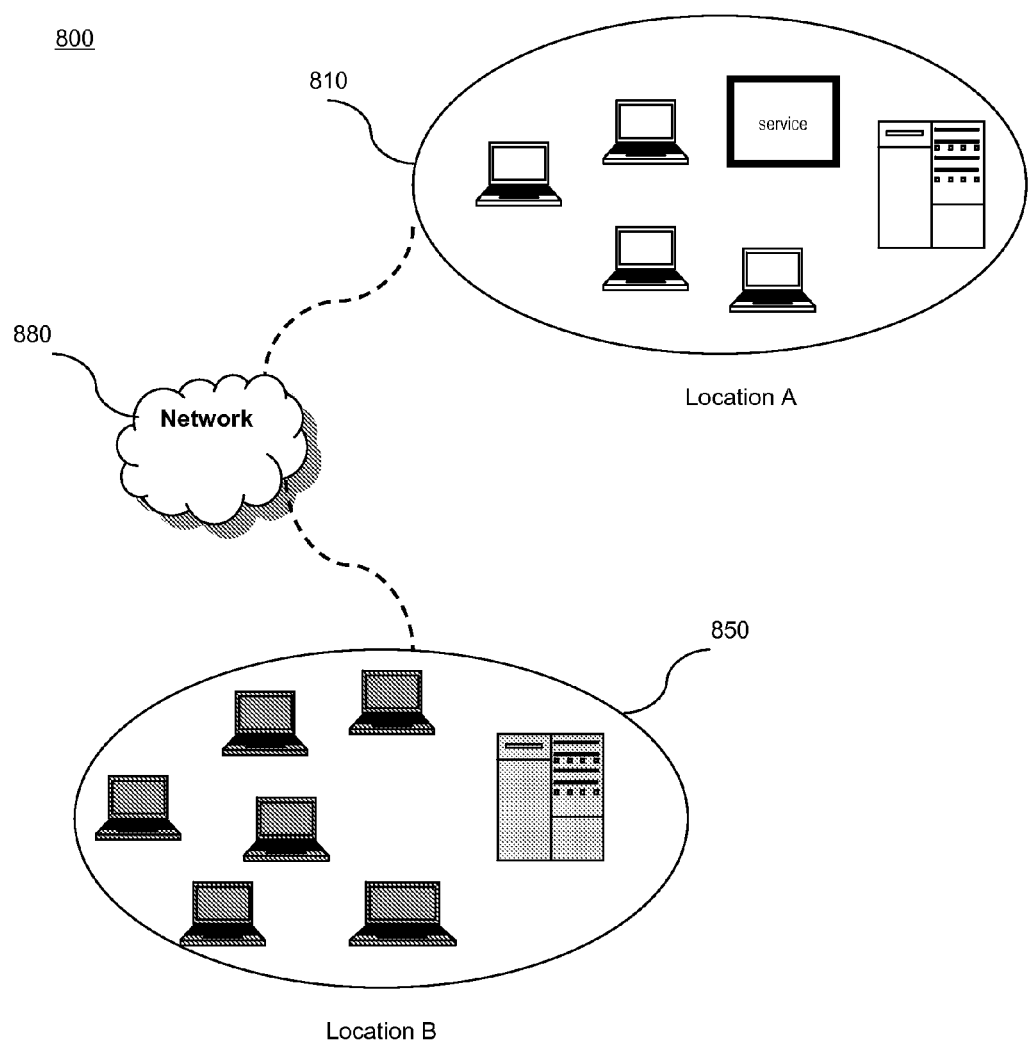
FIG. 8 is an illustration of a group interaction session with two services brokers coordinating the session occurring in two different locations simultaneously, according to an embodiment of the invention.

Alternatively, in sessions with a large number of participants, or with participants who are not collocated, some of the services broker 220 functionality may be replicated at each location, with some form of coordination between the multiple services brokers 220, as shown in FIG. 8. In these scenarios, the participants are typically collocated. To allow for the integration of remote services over the internet, we allow remote devices that provide environmental services. Service zones always have a dedicated service broker.

In the collaborative scheme of session 800, two services brokers administer the interactive session, one in each of the two locations. Location A 810 supports a services broker, an environmental service and four mobile devices. Location B 850 supports a services broker and six mobile devices. The environmental service in Location A is shared by both locations. The two locations coordinate their activities through the network 880. Certain environmental services, such as web browsing can be shared across zones. Services such as electronic whiteboards cannot be shared across zones.

To reduce the amount of state that needs to be stored at suspend time and restored at resume time, it may be preferable to avoid copying large amounts of content such as entire presentation files or entire web pages to the network database 275 and instead simply store a pointer to the location of these items as part of the session state. In this case, the content must be available at resume time. If the content has changed in the interim the session can be resumed, but the actual contents of the display will not be the same.

Therefore, while there have been described what are presently considered to be the preferred embodiments, it will understood by those skilled in the art that other modifications can be made within the spirit of the invention.

We claim:

1. A services broker for resuming a computer-supported multi-user session, the session comprising associations involving a plurality of participants, and the services broker; the services broker comprising:
   a memory;
   an input/output subsystem for transmission of session data and for communicating with the plurality of participants;
   a processor, operatively connected to the memory, for carrying out instructions; wherein the instructions, when executed by the processor, cause the processor to:
      receive a trigger event from at least one of the plurality of participants, said trigger event for resuming a suspended session;
      verify that the suspended session can be resumed;
      transmit a resume request to the plurality of participants;
      re-establish associations between the plurality of participants and the services broker; and
      transmit a stored relevant fraction of a session state to each of the plurality of participants for resuming the suspended session at the point where the suspended session was suspended;
   wherein the session state comprises:
      a unique session identifier for identifying the session;
      unique session identifiers for the plurality of participants; and
      an aggregate state of all session participants.

2. The services broker of claim 1 wherein the session state further comprises at least one selected from a group consisting of:
   a sequence in which the associations were suspended;
   a pointer to a location of a file containing logged events;
   a description of the session events; and
   a session start time, a first session suspend time, and zero or more consecutive pairs of session resume and suspend times.

3. The services broker of claim 1 wherein the session data is encrypted.

4. The services broker of claim 1 wherein the services broker is one of the plurality of participants.

5. The services broker of claim 1 wherein an environmental device is at least one of the plurality of participants.

6. The services broker of claim 5 wherein the program code when executed causes the processor to select the at least one environmental device for providing services to the plurality of participants.

7. A services broker for suspending a computer-supported multi-user session, the session comprising associations involving a plurality of participants, and the services broker; the services broker comprising:
   a memory;
   an input/output subsystem for transmission of session data and for communicating with the plurality of participants;
   a processor, operatively connected to the memory, for carrying out instructions;
   wherein the instructions, when executed by the processor, cause the processor to:
      transmit a suspend request to the plurality of participants upon receipt of a request to suspend event from the participant acting as session manager;
      receive a ready to suspend session state from each of the plurality of participants;
      acknowledge receipt of the each of the ready to suspend session states from the plurality of participants; and store the session data, wherein the session data comprises the suspended session state of each of the plurality of participants, a unique session identifier, and unique identifiers for the plurality of participants.

8. The services broker of claim 7 wherein the session data further comprises at least one selected from a group consisting of:
   a sequence in which the associations were established;
   a pointer to a location of a file containing logged events;
   a description of session events; and
   a session start time, and zero or more consecutive pairs of session suspend and resume times.

9. The services broker of claim 7 wherein the session data is encrypted.

10. The services broker of claim 7 wherein the services broker is one of the plurality of participants.

11. The services broker of claim 7 wherein an environmental device is at least one of the plurality of participants.

12. A computer-implemented method for establishing and suspending a computer-supported multi-user session, the session comprising associations involving a plurality of participants, and a services broker, the method comprising steps of:
   assigning a unique session identifier to the session;
   selecting an at least one environmental device for providing services to the plurality of participants;
   assigning unique identifiers to each of the plurality of participants and the at least one environmental device;
   establishing associations between each of the plurality of participants, and the at least one environmental device, and between each of the plurality of participants and the services broker;
   transmitting a suspend request to the at least one environmental device, upon receipt of an exit event from at least one of the plurality of participants;
   receiving an exit session state from the at least one environmental device;
   acknowledging receipt of the session state from the at least one environmental device; and
   storing session data, wherein the session data comprises: the exit session state, the unique session identifier, and the unique identifiers of the at least one participant and the at least one environmental device.

13. The computer-implemented method of claim 12 wherein the storing step further comprises a step of: encrypting the session data prior to storing it.

14. The computer-implemented method of claim 13 further comprising a step of sending a decryption key and the unique session identifier to one of the plurality of participants, such that the one participant is able to perform functions of the service broker.

15. The computer-implemented method of claim 12 wherein the storing step further comprises storing the session data in a remote storage.

16. A computer-implemented method for resuming a computer-supported multi-user session, the session comprising associations involving a plurality of participants, and a services broker, the method comprising steps of:
   receiving a trigger event from at least one of the plurality of participants, said trigger event for resuming a suspended session;
   verifying that the suspended session can be resumed;
   selecting an at least one environmental device for providing services to the plurality of participants;
   transmitting a resume request to the at least one environmental device; and
   transmitting a stored session state and stored session data to the at least one environmental device for resuming the suspended session at the point where the suspended session ended.

17. The method of claim 16 wherein the selecting step further comprises:
   selecting the at least one environmental device based upon an implicit condition such that the at least one environmental device selected matches the implicit condition.

18. The method of claim 16 further comprising a step of:
   providing transcoding services to the plurality of participants.

19. The method of claim 16 wherein the verifying step comprises:
   confirming that the suspended session was terminated correctly;
   confirming that the plurality of participants are available;
   confirming whether the at least one environmental device is available; and
   assigning an alternate environmental device in the event that the at least one environmental device is unavailable, after confirming that the alternate environmental device is capable of performing services performed by the unavailable environmental device.

20. The method of claim 16 wherein the step of transmitting a stored session state and stored session data further comprises steps of:
   providing a decryption key and the session identifier to the remote storage in order to verify authorized access to the stored session state and the stored session data; and
   retrieving the stored session state and stored session data from the remote storage upon verification.

* * * * *